US010486936B2

United States Patent
Frantzheld (10) Patent No.: US 10,486,936 B2
(45) Date of Patent: Nov. 26, 2019

(54) METHOD FOR DETERMINING A STATOR CURRENT VECTOR FOR STARTING A SYNCHRONOUS MACHINE OF A DRIVE OF A PASSENGER TRANSPORTATION APPARATUS

(71) Applicants: THYSSENKRUPP ELEVATOR AG, Essen (DE); ThyssenKrupp AG, Essen (DE)

(72) Inventor: Jürgen Frantzheld, München (DE)

(73) Assignees: THYSSENKRUPP ELEVATOR AG, Essen (DE); THYSSENKRUPP AG, Essen (DE)

( * ) Notice: Subject to any disclaimer, the term of this patent is extended or adjusted under 35 U.S.C. 154(b) by 391 days.

(21) Appl. No.: 15/539,073

(22) PCT Filed: Dec. 18, 2015

(86) PCT No.: PCT/EP2015/080577
§ 371 (c)(1),
(2) Date: Jun. 22, 2017

(87) PCT Pub. No.: WO2016/102385
PCT Pub. Date: Jun. 30, 2016

(65) Prior Publication Data
US 2017/0349396 A1   Dec. 7, 2017

(30) Foreign Application Priority Data

Dec. 23, 2014   (DE) .......................... 10 2014 226 967

(51) Int. Cl.
*B66B 1/30*   (2006.01)
*H02P 21/34*   (2016.01)

(52) U.S. Cl.
CPC .............. *B66B 1/304* (2013.01); *H02P 21/34* (2016.02)

(58) Field of Classification Search
CPC ................................. B66B 1/304; H02P 21/34
(Continued)

(56) References Cited

U.S. PATENT DOCUMENTS 3,716,770 A * 2/1973 Habisohn ................ H02P 25/20
                                                                318/259
4,926,105 A * 5/1990 Mischenko ............ H02P 21/06
                                                                318/800

(Continued)

FOREIGN PATENT DOCUMENTS

DE          19604701 C       6/1997
DE          10218773 A      12/2002
(Continued)

OTHER PUBLICATIONS

English Translation of International Search Report issued in PCT/EP2015/080577, dated Apr. 12, 2016 (dated Apr. 21, 2016).
English abstract for DE102012102898A.

*Primary Examiner* — David S Warren
(74) *Attorney, Agent, or Firm* — thyssenkrupp North America, Inc.

(57) ABSTRACT

A method for determining a stator current vector for starting a synchronous machine of a drive of a passenger transportation apparatus having a rotor and a stator with a stator winding may involve imposing different stator current vectors with different stator current vector directions on the stator winding over the course of a plurality of current application operations, determining from the different stator current vectors a minimum stator current vector with a minimum stator current vector direction at which a minimum driving torque acting on the rotor is generated in the synchronous machine, determining a starting stator current vector with a starting stator current vector direction from the (Continued)

minimum stator current vector, and imposing the starting stator current vector on the stator winding for starting the synchronous machine.

17 Claims, 4 Drawing Sheets

(58) Field of Classification Search
USPC .......................................................... 187/296
See application file for complete search history.

(56) References Cited

U.S. PATENT DOCUMENTS

| | | | | |
|---|---|---|---|---|
| 5,610,485 | A * | 3/1997 | Depenbrock | H02P 21/06 318/432 |
| 6,150,790 | A * | 11/2000 | Piazzalunga | H02P 6/22 318/362 |
| 8,754,603 | B2 * | 6/2014 | Arnett | H02P 3/18 318/432 |
| 9,509,241 | B2 * | 11/2016 | Malrait | H02P 6/21 |
| 2002/0175651 | A1 * | 11/2002 | Kaneko | H02P 6/18 318/700 |
| 2005/0083003 | A1 * | 4/2005 | Mochizuki | H02H 7/0851 318/452 |
| 2009/0284195 | A1 * | 11/2009 | Gallegos-Lopez | B60L 15/025 318/400.02 |
| 2011/0169436 | A1 * | 7/2011 | Takahashi | H02P 23/14 318/400.3 |
| 2012/0153883 | A1 * | 6/2012 | Hammel | H02P 6/18 318/400.33 |
| 2013/0015803 | A1 * | 1/2013 | Arnett | H02P 3/18 318/503 |
| 2015/0022126 | A1 * | 1/2015 | Schulz | H02P 21/22 318/400.02 |
| 2015/0123578 | A1 * | 5/2015 | Schulz | H02P 23/14 318/400.04 |
| 2015/0381088 | A1 * | 12/2015 | Malrait | H02P 6/21 318/400.11 |
| 2016/0126873 | A1 * | 5/2016 | Costanzo | G01R 19/175 318/400.04 |
| 2017/0250631 | A1 * | 8/2017 | Lamsahel | H02P 21/22 |
| 2017/0349396 | A1 * | 12/2017 | Frantzheld | H02P 1/46 |
| 2018/0278194 | A1 * | 9/2018 | Kawamura | H02P 27/06 |
| 2019/0097549 | A1 * | 3/2019 | Colby | H02P 1/022 |

FOREIGN PATENT DOCUMENTS

| | | |
|---|---|---|
| DE | 10213375 A | 10/2003 |
| DE | 102012102898 A | 10/2013 |
| EP | 0864197 A | 9/1998 |
| JP | 2001-078487 A | 3/2001 |
| JP | 2004-032907 A | 1/2004 |
| JP | 2012-253986 A | 12/2012 |
| KR | 1020060011714 | 2/2006 |
| WO | 2008/120580 A | 7/2010 |

* cited by examiner

METHOD FOR DETERMINING A STATOR CURRENT VECTOR FOR STARTING A SYNCHRONOUS MACHINE OF A DRIVE OF A PASSENGER TRANSPORTATION APPARATUS

CROSS REFERENCE TO RELATED APPLICATIONS

This application is a U.S. National Stage Entry of International Patent Application Serial Number PCT/EP2015/080577, filed Dec. 18, 2015, which claims priority to German Patent Application No. DE 10 2014 226 967.9 filed Dec. 23, 2014, the entire contents of both of which are incorporated herein by reference.

FIELD

The present disclosure generally relates to methods for determining stator current vectors for starting synchronous machines of drives for passenger transportation apparatuses, including synchronous machines in the form of linear motors.

BACKGROUND

Synchronous machines or synchronous motors can be employed in the drive systems of a passenger transportation apparatus, for example an elevator system, an escalator or a travelator. A synchronous machine has a stator (primary part) and a rotor (secondary part). The stator or primary part can incorporate a stator winding comprised of a plurality of phase windings. A stator current vector with a specific stator current vector direction can be imposed upon the stator winding. A stator current vector of this type is characteristic of the energization of the stator winding. The rotor or secondary part can be configured as an excitation winding or as a permanent magnet. For example, a synchronous machine of this type can be configured as a rotary motor or as a linear motor.

In order to permit the operation of a synchronous machine at optimum efficiency, and to generate the maximum possible effective driving torque on the rotor, an in-phase stator current vector must be imposed upon the stator winding. A corresponding stator current vector with an optimum stator current vector direction is thus imposed upon the stator winding. This optimum stator current vector direction is dependent upon the relative orientation of the rotor to the stator.

This is of particular significance in a passenger transportation apparatus which is driven by linear motors. For example, in an elevator system, the release of the brakes must be exactly synchronized with the application by the linear motor of a driving torque which at least corresponds to the gravitational weight of the—potentially fully-occupied—elevator cage, in order to protect the elevator cage against any uncomfortable subsidence, or even falling.

Specifically upon the starting or start-up of the synchronous machine, the relative orientation of the stator and rotor is generally not known. Although this orientation can be determined by means of sensors such as, for example, incremental transducers, a number of electrical rotations or a certain movement of the rotor are required for this in many cases, as the sensor is generally required to detect a specific reference signal in the first instance. For example, an incremental transducer is firstly required to detect an initial specific reference marker.

Until this reference signal is detected, and the orientation of the stator and rotor can be determined by means of the sensor, the optimum stator current vector direction is generally determined by other methods, for example by means of "test excitations".

In many cases, however, test excitations of this type are unsuitable for application in a synchronous machine in a passenger transportation apparatus. In general, these test excitations can only operate reliably if a sufficient degree of movement of the of the rotor is possible.

In general, however, for example in elevator systems, this is not the case, specifically upon the starting or start-up of the synchronous machine. For example, if a brake (holding brake) of the elevator system is activated, any movement of the synchronous machine is barely possible, if at all. Moreover, in elevator systems, it can be the case that only a very small amount of mechanical play is available between the rotor of the synchronous machine and a load (cabin or counterweight). Thus, during test excitations, only a severely limited movement of the rotor may be possible. By means of test excitations of this type, it is generally not possible, in an elevator system, to reliably determine an optimum stator current vector direction.

In DE 196 04 701 C1 it is proposed, for the determination of the initial rotor position, that test excitations are executed and the effects thereof upon the rotor are detected and evaluated by means of power or torque sensors. This might be appropriate for a rotary drive; in a linear drive, corresponding sensors for this purpose are required over the entire length of the drive (in a passenger transportation apparatus, a length of several hundred meters in some cases), thereby resulting in high costs.

It is therefore desirable to propose an improved option for the reliable determination of a stator current vector for starting a synchronous machine of a drive of a passenger transportation apparatus.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally concerns a method for determining a stator current vector for starting a synchronous machine of a drive of a passenger transportation apparatus, a drive for a passenger transportation apparatus, and a corresponding passenger transportation apparatus as disclosed by way of example below. Advantageous configurations are described in the sub-claims, and in the following description.

The passenger transportation apparatus is specifically configured as an elevator system, as an escalator or as a travelator.

The synchronous machine has a rotor, or secondary part, and a stator, or primary part, having a stator winding comprised of a plurality of phase windings. Specifically, the synchronous machine is configured as a three-phase synchronous machine with three phase windings.

The synchronous machine is specifically configured as a rotary motor, or specifically as a linear motor. A rotary motor of this type is employed, for example, in the pulley drive of an elevator system. The rotary motor can be connected to a pulley, for example via a gear train, and drive the latter. A rotary motor of this type can also be employed, for example, for the driving of a moveable conveyor belt in an escalator or in a travelator.

In a linear drive, either the primary part or the secondary part is configured as a stationary element. The other element of the linear drive is configured as moveable, and can be displaced along the stationary element. In an elevator system, the moveable element of the linear drive can be arranged, for example, on a cabin, or on a counterweight of a cabin. In an elevator shaft, the stationary element of the linear drive can be configured, for example, as a rail.

In the course of the method according to the invention, a starting stator current vector with a starting stator current vector direction is determined, which is imposed on the stator winding for starting the synchronous machine. If this starting stator current vector is imposed on the stator winding, the corresponding current is imposed on the stator winding, specifically in-phase, and the synchronous machines can be operated with optimum efficiency. According to the invention, the starting stator current vector is not determined directly, but indirectly by means of a minimum stator current vector with a minimum stator current vector direction, wherein, upon the imposition of this minimum stator current vector, a minimum driving torque acting on the rotor is generated in the synchronous machine.

To this end, different stator current vectors with different stator current vector directions are imposed on the stator winding over the course of a plurality of (specifically consecutive) current application operations.

The minimum stator current vector with the minimum stator current vector direction is determined from these different stator current vectors. The starting stator current vector with the starting stator current vector direction is determined from the minimum stator current vector, and the starting stator current vector is imposed on the stator winding for starting the synchronous machine.

This plurality of current application operations is specifically executed with different stator current vectors with in each case the same amplitude. To this end, specifically, a comparatively low amplitude is selected.

The different stator current vectors, with in each case the stator current vector direction, are each characteristic of a current which is applied to the stator winding. Specifically, the stator current vectors are each characteristic of a multiphase direct current. The different stator current vectors can specifically be considered as space vectors or current space vectors in a corresponding space vector diagram (specifically in a fixed-stator αβ-coordinate system). Stator current vectors or current space vectors are specifically to be considered as vectors or indices in a complex plane. The minimum stator current vector is specifically oriented in parallel with a reference axis. The maximum stator current vector is specifically oriented perpendicularly to a further (specifically the same) reference axis.

Specifically, the plurality of current application operations are executed or the different stator current vectors are imposed (consecutively) on the stator winding until such time as the minimum stator current vector is determined. Alternatively, a predefined number of current application operations can also be executed, and the minimum stator current vector can be determined thereafter from all the imposed stator current vectors for the current application operations executed.

Specifically, two minimum stator current vectors with two minimum stator current vector directions can also be determined, whereby a minimum driving torque acting on the rotor is generated in each case. These two minimum stator current vector directions are specifically separated by an angle of 180°. In this case, the starting stator current vector can specifically be determined from these two minimum stator current vectors.

According to the invention, the driving torque acting on the rotor or the power generated in the synchronous machine are not determined specifically and precisely, in order to determine the starting stator current vector. Specifically, neither the movement, nor the speed of rotation, nor the velocity of the synchronous machine need to be determined specifically and precisely. For the purposes of the invention, it is only determined whether any driving torque or any movement at all has been generated in the synchronous machine. Specific values for this movement, this torque, a corresponding speed of rotation or a corresponding velocity are of no significance.

According to the invention, in the course of the plurality of current application operations, the minimum stator current vector is identified. If, upon the imposition of a specific stator current vector, a driving torque is generated, it can be ruled out that said specific stator current vector is the minimum stator current vector sought, regardless of the specific magnitude of the driving torque generated, and of the specific corresponding movement, speed of rotation and velocity.

Accordingly, for the purposes of the invention, it not necessary to ensure a sufficient movement of the synchronous machine, or a sufficient displacement or movement of the rotor. For the purposes of the invention, the sensors by means of which the driving torque or the movement of the synchronous machine can be determined are not subject to any requirements. Even within the smallest possible measuring or working range of such sensors, for example within a range of one increment on an incremental transducer, the invention can be executed precisely and effectively.

In the context of the method according to the invention, specifically, it is sufficient that the direction of the driving torque or the direction of a movement resulting from the driving torque are detected and evaluated, but not the magnitude of the driving torque or the magnitude of the movement. The sensor technology employed can thus be of a significantly more cost-effective, and simultaneously more reliable design, as the sensor technology is not required to execute the exact determination of magnitude.

Specifically, for the detection of a driving torque, an acceleration sensor which is rigidly connected to the rotor is appropriate. This acceleration sensor can be fitted, for example, to the elevator cage of an elevator cabin. Even the smallest abrupt movements can be detected by the acceleration sensor, thereby allowing the presence of a driving torque to be concluded. The acceleration sensor moreover permits a conclusion to be drawn with respect to the direction of the driving torque. Even in the case of the very long linear motors employed in the field of passenger transportation apparatus, a single acceleration sensor can be sufficient to detect the direction of a test driving torque applied in every potential rotor position.

In the course of the starting or start-up of the synchronous machine, the relative orientation of the stator and rotor is generally not known. By means of the invention, the starting stator current vector which permits the optimum start-up of the synchronous machine can be rapidly and effectively determined, and the synchronous machine can be operated in an optimum manner. Here, a number of electrical rotations or a certain movement of the synchronous machine are not required in the first instance. Specifically, the corresponding sensor is generally not required to firstly detect a specific reference signal.

Preferably, from the starting stator current vector, a commutation offset (commutation displacement) is determined for the subsequent routine service of the drive. The commutation offset establishes a relationship between the actual rotor position or rotor setting (for example, an angular position of the rotor) and a measuring signal from a rotor position sensor (for example, an incremental transducer) and is required for the correct alternating energization of the phase winding of the stator.

Accordingly, the commutation offset represents a phase displacement between the actual rotor position and the rotor position detected by the rotor position sensor. If this commutation offset is known, the measured rotor position for the actuation of the synchronous machine, corrected by the commutation offset, can be established. However, if the commutation offset is not known, as can be the case, for example, upon the start-up of the synchronous machine, this relationship between the measuring signal delivered by the rotor position sensor and the actual rotor position must firstly be determined.

By means of the starting stator current vector determined, it is possible to conclude the actual rotor position. Upon the imposition of the starting stator current vector, the rotor is in the rotor position in which the maximum movement is generated. Accordingly, the commutation offset can be determined from the starting stator current vector.

Preferably, from the various stator current vectors, a zero stator current vector with a zero stator current vector direction is determined as a minimum stator current vector, at which essentially no, or at least virtually no driving torque acting on the rotor is generated in the synchronous machine. It is further preferred that, from the minimum stator current vector, a maximum stator current vector with a maximum stator current vector direction is determined as the starting stator current vector, at which a maximum driving torque acting on the rotor is generated in the synchronous machine.

The zero stator current vector is specifically oriented in parallel with a reference axis, and the maximum stator current vector specifically perpendicularly to said reference axis. The zero stator current vector and the maximum stator current vector are thus specifically mutually perpendicular.

The maximum stator current vector can specifically be determined from the zero stator current vector, by an angular value of +90° or −90° being added to the zero stator current vector direction, in order to determine the maximum stator current vector direction.

If two minimum stator current vectors are determined, two zero stator current vectors are specifically determined, which are displaced by 180°, respectively oriented in parallel with the reference axis and running in opposite directions. Specifically, the maximum stator current vector is perpendicular to these two zero stator current vectors.

Preferably, the stator current vectors of the plurality of current application operations are each determined or selected on the basis of a predefined criterion. Specifically, following the execution of a present current application operation of the plurality of current application operations, with a present stator current vector having a present stator current vector direction, a next stator current vector with a next stator current vector direction is determined or selected specifically in each case for a next of the plurality of current application operations, in accordance with the predefined criterion. In each case, the next stator current vector direction is preferably determined with reference to the present stator current vector direction. Advantageously, the next stator current vector direction is determined in each case by a respective angular value being added to the present stator current vector direction or subtracted from said present stator current vector direction.

According to a first preferred embodiment of the invention, a constant angular value is selected for the plurality of current application operations. This constant angular value, in each case, is added to the present stator current vector direction or subtracted from said present stator current vector direction, and is preferably added thereto. Accordingly, the stator current vector direction for each of the consecutive current application operations is increased or reduced in each case by the constant and fixed angular value. This constant angular interval can, for example be 1°, 2° or 5°.

Specifically, in the course of the plurality of current application operations, different stator current vectors are consecutively imposed upon the stator winding, until such time as the desired minimum stator current vector is identified or determined. Alternatively, a predefined number of current application operations can also be executed. For example, the different stator current vector directions within a range of 0° to 360° can be determined in each case by the addition of the constant angular value of 5°. In this case, specifically, 72 different current application operations are executed.

According to a second preferred embodiment of the invention, a different angular value is selected for each of the plurality of current application operations. Advantageously, the angular value for each of the next of the plurality of current application operations is reduced in each case, and is preferably halved in each case. The angular value is thus consecutively or iteratively reduced or halved. Accordingly, a consistently smaller angular value is added to the present stator current vector direction or is subtracted therefrom in each case. From one current application operation to the next, the stator current vector direction is adjusted by progressively smaller angular values.

Specifically, the angular value has a starting value of 90°. A first stator current vector direction for a first of the plurality of current application operations can, for example, be selected at random. The starting value of 90° for the angular value is thus added to this first stator current vector direction, or subtracted therefrom, in order to determine a second stator current vector direction for a second of the plurality of current application operations. In this case, an angular value of 45° is added to this second stator current vector direction, or is subtracted therefrom, in order to determine a third stator current vector direction. In turn, an angular value of 22.5° is added to this third stator current vector direction, or is subtracted therefrom, etc. Specifically, this addition or subtraction of the angular value is continued until such time as the angular value undershoots a predefined threshold value, for example 1°. More specifically, this addition or subtraction of the angular value can be executed until such time as the minimum stator current vector is determined.

By this method, the direction of the minimum stator current vector can be narrowed down to an angular range of less than 6° after just five current application operations, and to an angular range of less than 0.5° after just nine current application operations.

Whether the respective angular value is added to the present stator current vector direction of the present of the plurality of current application operations or subtracted from the latter, is preferably determined in each case according to a driving torque acting on the rotor and generated in the course of the present of the plurality of current application operations, and is further preferably determined with reference to a direction of movement of a movement of the rotor generated in the course of the present of the plurality of current application operations. If the direction of movement changes, the sign of the angular value also changes. Accordingly, the angular value is added or subtracted, until such time as the minimum driving torque is generated, or no further movement is generated in the synchronous machine. In this case, if, in the course of one of the plurality of current application operations, the minimum driving torque is generated, or no movement is generated, the minimum stator current vector has been identified. Determination of this type as to whether the respective angular value is to be added or subtracted is specifically suitable for the variable angular value.

As further described above, it is not necessary for the movement or the corresponding driving torque, a corresponding speed of rotation or a corresponding velocity of the synchronous machine to be determined in a specific and precise manner. Only the direction of this movement or driving torque is determined. Again, for this purpose, it is not necessary to ensure a sufficient movement of the synchronous machine. The direction of movement can be determined, even in the event of the smallest possible movement of the synchronous machine. Again, in this configuration of the invention, the sensors by means of which the driving torque or the movement of the synchronous machine can be determined are not subject to any requirements. Again, this configuration can be executed precisely and effectively within the smallest possible measuring or working range of such sensors.

Preferably, the angular value is added to the present stator current vector direction of the present of the plurality of current application operations if, in the course of the present of the plurality of current application operations on the synchronous machine, a movement is generated in the negative direction of movement. If, in the course of the present of the plurality of current application operations on the synchronous machine, a movement in the positive direction of movement is generated, the angular value is preferably subtracted from the present stator current vector direction of the present of the plurality of current application operations.

Preferably, after the determination of the minimum stator current vector, a check is executed as to whether, upon the imposition of the minimum stator current vector on the synchronous machine, the minimum driving torque acting on the rotor is generated. In the course of this check, different stator current vectors in the minimum stator current vector direction determined, and with different amplitudes, are imposed on the stator winding in the course of a plurality of further current application operations. Here, in each case, a check is executed as to whether, in the course of said plurality of further current application operations on the synchronous machine, the minimum driving torque acting on the rotor is generated respectively.

It can thus be verified whether the minimum stator current vector has been correctly determined. If, in the course of this plurality of further current application operations, the minimum driving torque is actually generated in each case, the starting stator current vector can be determined from the minimum stator current vector determined. Otherwise, specifically, a preferred embodiment of the invention is executed once more, and a further minimum stator current vector is determined.

Advantageously, prior to the present of the plurality of current application operations, in the course of which a present stator current vector with a present stator current vector direction is imposed on the stator winding, an inverse stator current vector with an inverse stator current vector direction to the present stator current vector direction is imposed on the stator winding. Specifically, the present stator current vector direction and the inverse stator current vector direction are thus offset by 180°. The present and the inverse stator current vectors are thus mutually parallel, but run in opposite directions. The amplitude and duration of this inverse current application operation and the present of the plurality of current application operations are specifically selected with identical values. This inverse current application operation specifically ensures that the elasticity of a drive train of the drive system is fully exploited. Moreover, any dead stop can thus be counteracted.

This inverse current application operation can specifically be executed before each of the plurality of current application operations, or only before a specific number of the plurality of current application operations, for example, only before every other of said current application operations. Specifically, before a first of the plurality of current application operations, in the course of which a first stator current vector with a first stator current vector direction is imposed on the stator winding, an inverse stator current vector with an inverse stator current vector direction to the first stator current vector direction is imposed on the stator winding.

Preferably, in the course of the plurality of current application operations, each of the different stator current vectors is imposed on the stator winding for a specific time interval. Specifically, this time interval for each of the plurality of current application operations can be selected with an equal magnitude. Preferably, this time interval is 75 ms, 50 ms or 25 ms. Specifically, the respective inverse stator current vectors in the case of the inverse current application operations are also respectively imposed for a predefined time interval. Moreover, a pause or waiting time equal to a predefined time interval can preferably be applied between each of the plurality of current application operations and, where applicable, the plurality of inverse current application operations. Again, this time interval can specifically be selected with the same duration for each of the plurality of current application operations, and is preferably 75 ms, 50 ms or 25 ms.

The invention further relates to a drive for a passenger transportation apparatus and to a passenger transportation apparatus having such a drive. A drive according to the invention for a passenger transportation apparatus comprises a synchronous machine having a rotor and having a stator having a stator winding with a plurality of phase windings. The drive moreover comprises a control unit, which is designed for the execution of a preferred embodiment of the method according to the invention. Configurations of this drive according to the invention and of this passenger transportation apparatus according to the invention proceed from the above description of the method according to the invention in an analogous manner.

Further advantages and configurations of the invention proceed from the description and the attached drawing.

It is understood that the aforementioned characteristics, and those still to be described hereinafter, are not only applicable in the combination respectively indicated, but also in other combinations or in isolation, without departing from the scope of the present invention.

Figure 1:
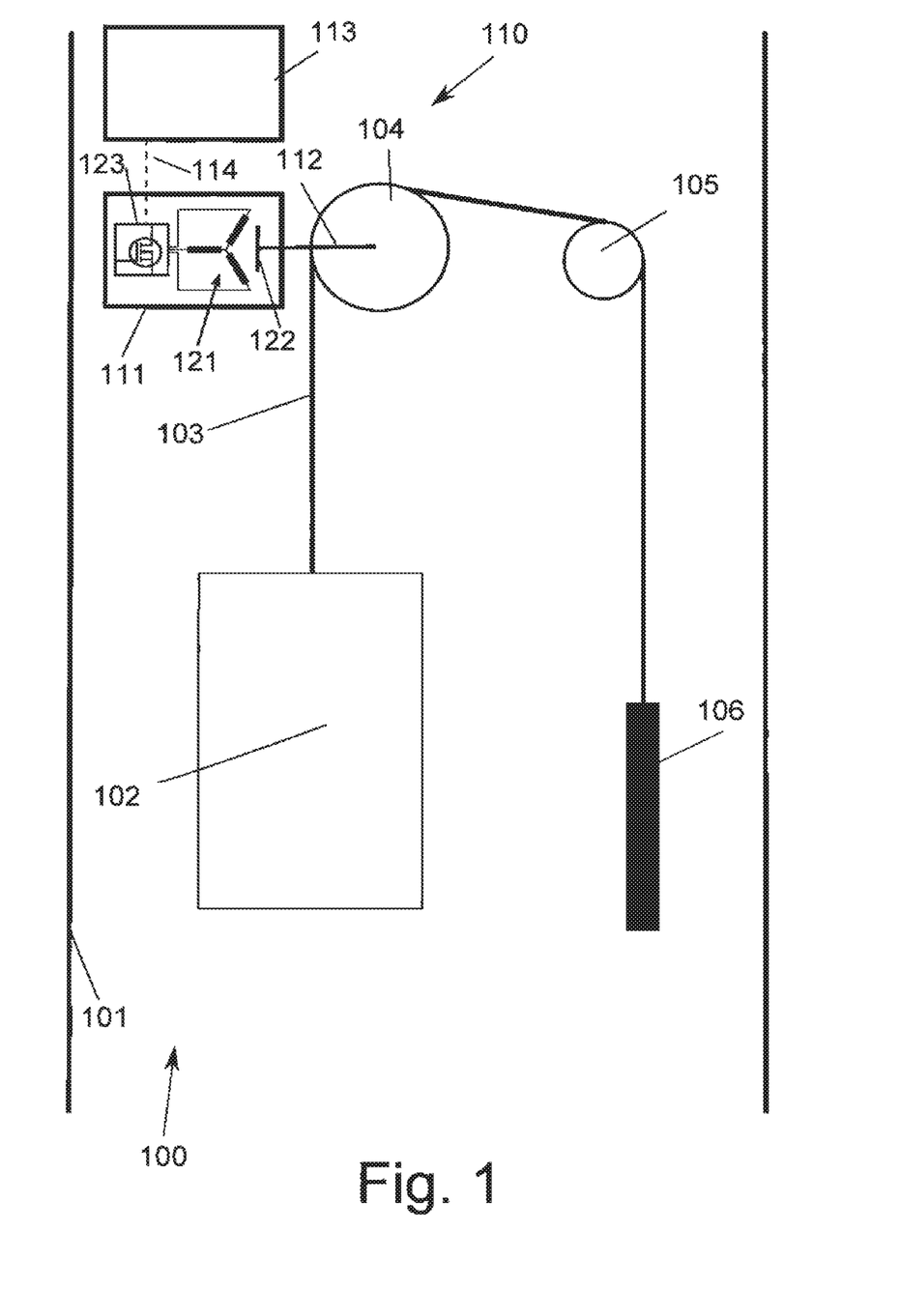
FIG. 1 is a schematic view of an example passenger transportation apparatus with an example configuration of a drive.

FIG. 1 shows a schematic representation of a preferred configuration of a passenger transportation apparatus according to the invention, denoted by the number 100. In this example, the passenger transportation apparatus is configured as an elevator system 100.

The elevator system 100 comprises a cabin 102 which is arranged to move in an elevator shaft 101. The cabin 102 is suspended on a suspension rope 103, and is connected to a counterweight 106 via a pulley 104 and a deflection pulley 105.

The elevator system 100 comprises a preferred configuration of a drive 110 according to the invention which, in the present example, is configured as a pulley drive. The pulley drive 110 comprises the pulley 104 and a synchronous machine 111 configured as a rotary motor. The synchronous machine 111 is connected to the pulley 104 via a shaft 112, and can drive the latter. The pulley drive 110 further comprises a control unit 113, which actuates the synchronous machine 111, and is identified by the reference number 114.

The synchronous machine 111 is configured, for example, as a three-phase synchronous machine. A stator 121 or primary part of the synchronous machine 111 comprises a stator winding having, for example, three phase windings. A rotor 122 or secondary part of the synchronous machine 111 comprises, for example, an excitation winding or a permanent magnet arrangement. The phase windings of the stator 121 are connected to a power converter circuit 123. This power converter circuit 123 comprises appropriate switching elements such as, for example, MOSFETs (metal oxide semiconductor field-effect transistors) (in FIG. 1, for exemplary purposes only, a single MOSFET is represented). The individual switching elements of the power converter circuit 123 are actuated by the control unit 113.

In order to drive the pulley 104, the synchronous machine 111 is energized. A rotary stator current vector is thus imposed on the stator winding of the synchronous machine 111. In order to operate the synchronous machine 111 at optimum efficiency and to generate the maximum possible driving torque for application to the rotor, an in-phase stator current vector must be imposed on the stator winding. A maximum stator current vector is thus imposed on the stator winding, at which a maximum driving torque acting on the rotor is generated in the synchronous machine 111. The maximum stator current vector customarily leads the magnetic flux of the rotor by an angle of 90°.

Specifically upon the starting or start-up of the synchronous machine 111, this maximum stator current vector is unknown. For the starting of the synchronous machine 111, an appropriate starting stator current vector must firstly be determined.

To this end, the control unit 113 is designed to execute a preferred embodiment of a method according to the invention. In this preferred embodiment, in the course of a plurality of current application operations, different stator current vectors with different stator current vector directions are consecutively imposed on the stator winding. From these different stator current vectors, a minimum stator current vector is firstly determined, at which no driving torque acting on the rotor is generated. From this minimum stator current vector, the maximum stator current vector is determined as the starting stator current vector.

This preferred embodiment is described hereinafter with reference to FIG. 2. FIG. 2 shows a schematic representation of stator current vector diagrams or space vector diagrams in a fixed-stator $\alpha\beta$-coordinate system, which can be determined in the course of the preferred embodiment. Each of the eight stator current vector diagrams in FIGS. 2a to 2h is respectively characteristic of one of the plurality of current application operations which are executed in the course of this preferred embodiment of the method according to the invention.

Stator current vectors or current indices are represented in a stator current vector diagram as vectors or indices. Stator current vectors are characteristic of the energization of the stator winding of the synchronous machine 111. All the stator current vectors intersect at the origin of the $\alpha\beta$-coordinate system and terminate at the circumference of a circle, the center of which coincides with the origin. A stator current vector direction of a stator current vector is described by a relative angle to a reference axis.

In the stator current vector diagrams in FIGS. 2a to 2h, this circle is represented in each case. The circles are subdivided into two semi-circles by a first reference axis. In FIGS. 2a to 2h, this first reference axis is identified by the symbol "$F_{min}$". A first semi-circle is identified by the symbol "+", and a second semi-circle by the symbol "–".

This first reference axis gives an exemplary minimum direction for the starting rotor position. Stator current vectors which are oriented in this minimum direction, or parallel to the first reference axis, are designated as minimum stator current vectors with a minimum stator current vector direction in which, respectively, no driving torque is generated at the initial rotor position in the synchronous machine 111.

In the synchronous machine 111, upon the imposition of stator current vectors which are oriented in the first semi-circle, in the present example, a movement or a driving torque in the positive direction of movement is generated respectively. Conversely, upon the imposition of stator current vectors which are oriented in the second semi-circle, in this exemplary representation, a movement or a driving torque in the negative direction of movement is generated respectively in the synchronous machine 111.

A second reference axis gives an exemplary maximum direction for the initial rotor position. In the present example, this second reference axis is oriented perpendicularly to the first reference axis. In FIGS. 2a to 2h, this second reference axis is identified by the symbol "$F_{max}$". Stator current vectors which are oriented in this maximum direction, or parallel to the second reference axis, are designated as maximum stator current vectors which, in the synchronous machine 111, generate the maximum driving torque at the initial rotor position.

This preferred embodiment of the method according to the invention, in the course of which a plurality of current application operations are executed with different stator current vectors, is described hereinafter.

Figure 2A:
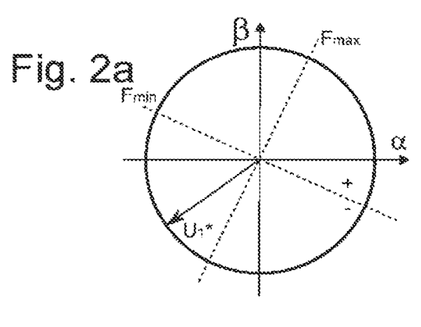
FIG. 2 is a schematic view of stator current vector diagrams, which can be determined by way of an example method according to the present disclosure.
Figure 2B:
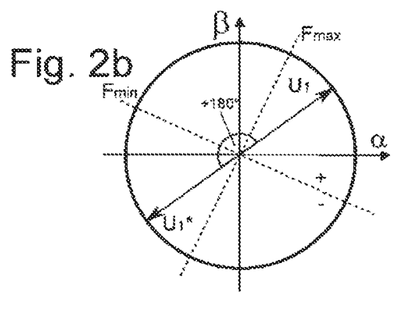

FIG. 2b describes a first of the plurality of current application operations with a first stator current vector $U_1$, having a first stator current vector direction. This first stator current vector $U_1$ is oriented, for example, in the direction of a corresponding commutation offset, which has been assumed upon the stopping of the synchronous machine 111.

Before this first current application operation is executed, an inverse current application operation is firstly executed in accordance with FIG. 2a, with an inverse stator current vector direction to the first stator current vector direction. This inverse stator current vector direction is offset from the first stator current vector direction by an angle of 180°.

An inverse stator current vector, designated in FIG. 2a as $U_1^*$, is imposed on the stator winding. Thereafter, in accordance with FIG. 2b, the first of the plurality of current application operations is executed. As can be seen in FIG. 1, the first stator current vector $U_1$ and the inverse stator current vector $U_1^*$ are oriented in parallel, but in opposing directions.

Figure 2C:
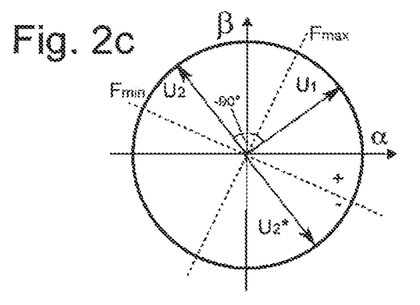

Thereafter, in FIG. 2c, a second of the plurality of current application operations is executed with a stator current vector $U_2$, having a second stator current vector direction. Before the second stator vector $U_2$ with the second stator current vector direction is imposed on the stator winding, a further inverse current application operation can be executed, in the course of which an inverse stator current vector $U_2^*$ having a stator current vector direction which is offset from the second stator current vector direction by an angle of 180° is imposed on the stator winding.

A respective next stator current vector direction of a next of the plurality of current application operations is determined in each case, wherein a different angular value is added to a present stator current vector direction of the present of the plurality of current application operations, or is subtracted therefrom. This different angular value is halved in each case for each of the next of the plurality of current application operations.

The second stator current vector direction is thus determined, wherein a first angular value is added to the first stator current vector direction, or is subtracted therefrom. In the present example, this first angular value is 90°.

Whether the respective angular value is added or subtracted is dependent upon a direction of movement of a present movement generated in the synchronous machine 111 for the initial rotor position. As can be seen from the first stator current vector $U_1$ in FIG. 2b, the first of the current application operations in the synchronous machine 111 generates a movement in the positive direction of movement. In the event of such a positive direction of movement, the respective angular value is subtracted.

The second stator current vector direction is determined accordingly, wherein the first angular value of 90° is subtracted from the first stator current vector direction.

As can be seen from the second stator current vector $U_2$ in FIG. 2c, the second of the plurality of current application operations in the synchronous machine 111 also generates a movement in the positive direction of movement. A third stator current vector direction is determined accordingly, wherein a second angular value of 45° is subtracted from the second stator current vector direction.

Figure 2D:
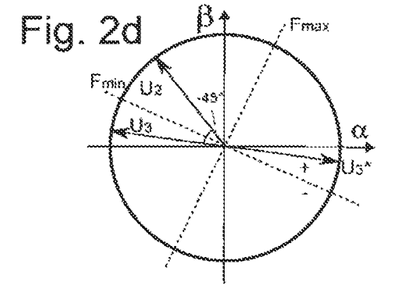

According to FIG. 2d, a third of the plurality of current application operations is executed with a third stator current vector $U_3$, having this third stator current vector direction. Prior to this third current application operation, an inverse current application operation is executed with an inverse stator current vector $U_3^*$. The third of the plurality of current application operations generates a movement in the negative direction of movement, for the initial rotor position in the synchronous machine 111. A fourth stator current vector direction is determined accordingly, wherein a third angular value of 22.5° is added to the third stator current vector direction.

Figure 2E:
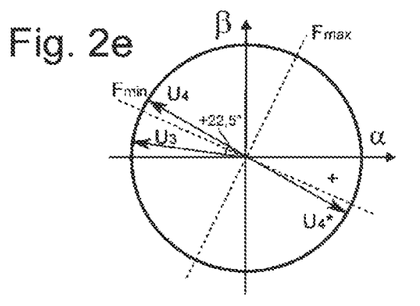

According to FIG. 2e, a fourth of the plurality of current application operations is executed with a fourth stator current vector $U_4$, having this fourth stator current vector direction. Prior to this fourth current application operation, an (optional) inverse current application operation is executed with an inverse stator current vector $U_4^*$. The fourth of the plurality of current application operations again generates a movement in the positive direction of movement, for the initial rotor position. From the fourth stator current vector direction, a fourth angular value of 11.25° is therefore subtracted, in order to determine a fifth stator current vector direction.

Figure 2F:
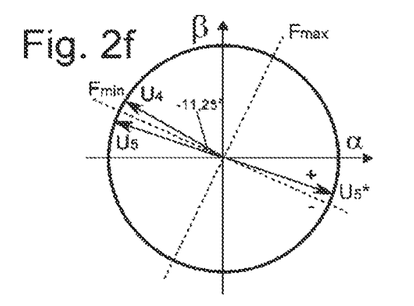

In this fifth stator current vector direction, according to FIG. 2f, an inverse current application operation with an inverse stator current vector $U_5^*$ is firstly executed, and thereafter a fifth of the plurality of current application operations with a fifth stator current vector $U_5$. This fifth of the plurality of current application operations generates a movement in the negative direction of movement, for the initial rotor position. A fifth angular value of 5.625° is added to the fifth stator current vector direction, in order to determine a sixth stator current vector direction.

Figure 2G:
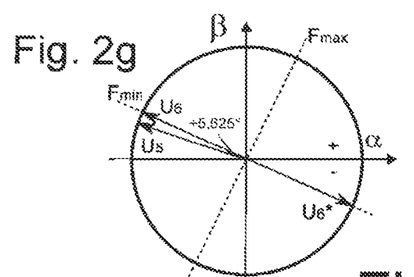

A sixth of the plurality of current application operations is executed, in accordance with FIG. 2g, with this sixth stator current vector direction and with a corresponding sixth stator current vector $U_6$. Beforehand, an (optional) inverse current application operation is executed with an inverse stator current vector $U_6^*$.

This sixth stator current vector $U_6$ is oriented in parallel with the first reference axis and, upon the imposition thereof on the synchronous machine for the initial rotor position, generates no driving torque or no movement. This sixth stator current vector $U_6$ represents the desired minimum stator current vector. The sixth stator current vector direction represents the desired minimum stator current vector direction.

Figure 2H:
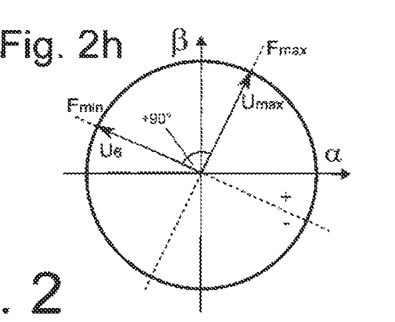

In order to determine the maximum stator current vector $U_{max}$ for the initial rotor position from this minimum stator current vector $U_6$ and this minimum stator current vector direction, in accordance with FIG. 2h, an angular value of 90° is added to or subtracted from the minimum stator current vector direction. Whether this angular value of 90° is to be added or subtracted is specifically dependent upon a desired direction of movement upon the start-up of the synchronous machine 111. For the starting of the synchronous machine 111, this maximum stator current vector $U_{max}$ is imposed on the stator winding as the starting stator current vector.

Moreover, from this maximum stator current vector $U_{max}$, a commutation offset is determined for the subsequent routine operation of the synchronous machine 111. This commutation offset establishes a relationship between the actual rotor position and a measuring signal from a rotor position sensor, and is required for the correct alternating energization of the phase winding of the stator 121.

Each of the current application operations and the inverse current application operations according to FIGS. 2a to 2g is executed for a predetermined time interval of 50 ms in each case, and a pause is applied between each of the current application operations according to FIGS. 2a to 2g, also for a predetermined time interval of 50 ms in each case. Moreover, each of these current application operations according to FIGS. 2a to 2g is executed with the same amplitude.

If, in the course of the first current application operation with the first stator current vector $U_1$ and/or in the course of the corresponding inverse current application operation with the inverse stator current vector $U_1^*$, no movement is detected, the current application operation is repeated with a higher amplitude, until such time as a movement is established. If the amplitude is increased in this case to a definable amplitude threshold value, without the detection of any movement, the first direction is established as the minimum stator current vector direction.

Specifically, moreover, further to the respective final current application operation by means of which the minimum stator current vector direction has been established, a plurality of further current application operations can be executed. In the course of this plurality of further current application operations, different stator current vectors having the minimum stator current vector direction established, and of different respective amplitudes, are imposed respectively on the stator winding. In each case, a check is executed here as to whether no driving torque acting on the rotor is generated in the synchronous machine respectively, and whether the minimum stator current vector direction established is actually the desired minimum stator current vector direction.

Figure 3:
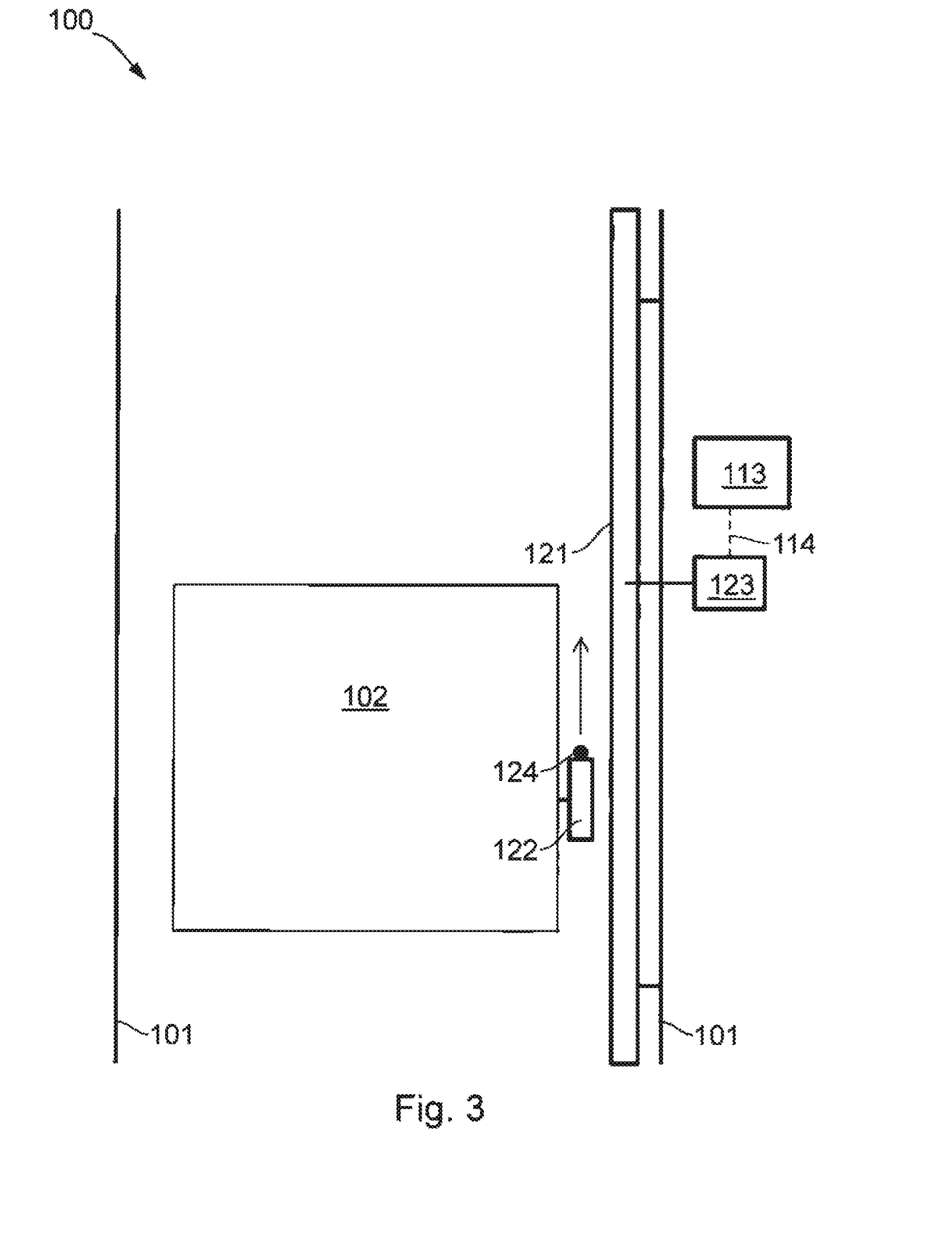
FIG. 3 is a schematic view of another example configuration of a passenger transportation apparatus with an example configuration of a drive.

FIG. 3 shows an elevator system 100, having a linear motor drive system actuated according to the invention as a synchronous machine. The synchronous machine here comprises a stator 121 of longitudinal configuration, which essentially extends over the full height of the elevator shaft 101. The stator 121 generates a magnetic field which travels along the elevator shaft. A rotor 122 is securely fitted to the elevator cage 102, and is actuated by the traveling magnetic field. By means of an acceleration sensor 124 which is rigidly connected to the rotor, the smallest movements of the elevator cage and/or of the rotor 122 can be detected. Otherwise, the design and function substantially correspond to the configuration represented in FIGS. 1 and 2.

Figure 4:
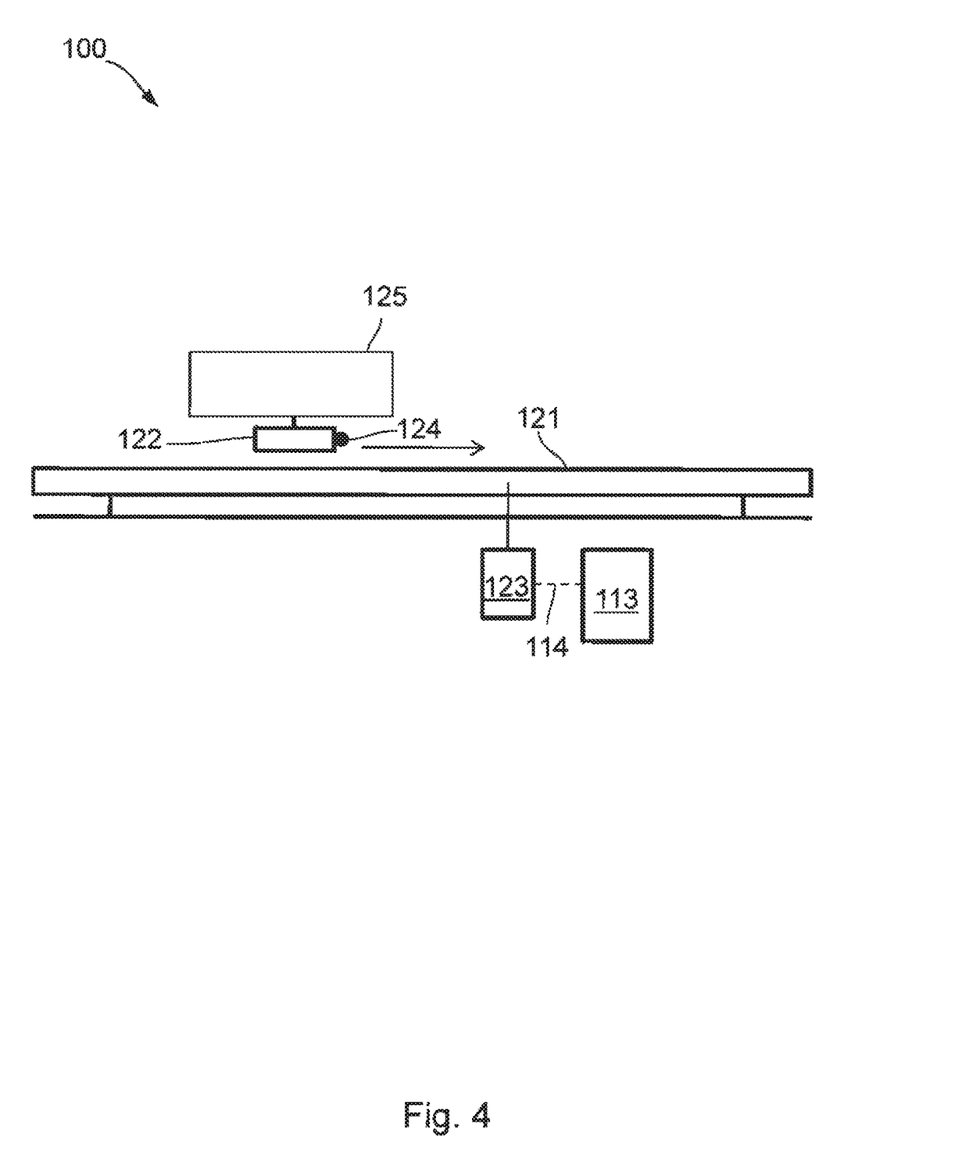
FIG. 4 is a schematic view of still another example configuration of a passenger transportation apparatus with an example configuration of a drive.

FIG. 4 shows a travelator 100 having a linear motor drive system actuated according to the invention as a synchronous machine. The synchronous machine comprises here a stator 121 of longitudinal configuration, which essentially extends over the full length of the travelator. The stator 121 generates a magnetic field which travels along the length of travel. A rotor 122 is securely fitted to a pallet 125, and is actuated by the traveling magnetic field. By means of an acceleration sensor 124, which is rigidly connected to the rotor, the smallest movements of the pallet 125 and/or of the rotor 122 can be determined. Alternatively, positional sensors installed in the travelator can also be used to detect movements of the pallet. Otherwise, the design and function substantially correspond to the configurations represented in FIGS. 1 to 3.

LIST OF REFERENCE SYMBOLS

100 Passenger transportation apparatus (elevator system, travelator)
101 Elevator shaft
102 Cabin
103 Suspension rope
104 Pulley
105 Deflection pulley
106 Counterweight
110 Drive, pulley drive
111 Synchronous motor, rotary motor, linear motor
112 Shaft
113 Control unit
114 Synchronous motor actuation system
121 Stator, primary part
122 Rotor, secondary part
123 Power converter circuit
124 Acceleration sensor
125 Pallet
$\alpha$ Coordinate axis
$\beta$ Coordinate axis
$F_{min}$ first reference axis
$F_{max}$ second reference axis
$U_1$ first stator current vector
$U_2$ second stator current vector
$U_3$ third stator current vector
$U_4$ fourth stator current vector
$U_5$ fifth stator current vector
$U_6$ sixth stator current vector, minimum stator current vector
$U_1^*$ inverse stator current vector
$U_2^*$ inverse stator current vector
$U_3^*$ inverse stator current vector
$U_4^*$ inverse stator current vector
$U_5^*$ inverse stator current vector
$U_6^*$ inverse stator current vector
$U_{max}$ maximum stator current vector

What is claimed is:

1. A method for determining a stator current vector for starting a synchronous machine of a drive of a passenger transportation apparatus that includes a rotor and a stator with a stator winding, the method comprising:
    imposing different stator current vectors with different stator current vector directions on the stator winding over a course of a plurality of current application operations;
    determining from the different stator current vectors a minimum stator current vector with a minimum stator current vector direction at which a minimum driving torque acting on the rotor is generated in the synchronous machine;
    determining from the minimum stator current vector a starting stator current vector with a starting stator current vector direction; and
    imposing the starting stator current vector on the stator winding for starting the synchronous machine.

2. The method of claim 1 comprising at least one of:
    determining from the different stator current vectors a zero stator current vector as the minimum stator current vector at which no driving torque acting on the rotor is generated in the synchronous machine; or
    determining from the minimum stator current vector a maximum stator current vector as the starting stator current vector at which a maximum driving torque acting on the rotor is generated in the synchronous machine.

3. The method of claim 1 comprising determining each of the different stator current vectors of the plurality of current application operations based on a predefined criterion.

4. The method of claim 3 wherein for determining each subsequent stator current vector direction of a subsequent stator current vector in a subsequent of the plurality of current application operations, a preceding stator current vector direction of a preceding stator current vector in a preceding of the plurality of current application operations is used as the predefined criterion.

5. The method of claim 4 wherein each subsequent stator current vector direction is determined by adding or subtracting an angular value to/from each preceding stator current vector direction.

6. The method of claim 5 wherein the angular value that is added or subtracted is halved for each subsequent stator current vector direction.

7. The method of claim 5 wherein whether the angular value is added or subtracted to/from each preceding stator current vector direction depends on a direction of a driving torque acting on the rotor that is generated by each preceding stator current vector.

8. The method of claim 1 wherein after the minimum stator current vector is determined, the method further comprises performing a check as to whether the minimum driving torque acting on the rotor is generated upon imposing the minimum stator current vector on the synchronous machine.

9. The method of claim 8 wherein the check comprises:
imposing multiple stator current vectors of different amplitudes in the minimum stator current vector direction on the stator winding in multiple further current application operations; and
determining whether the minimum driving torque acting on the rotor is generated in each of the multiple further current application operations.

10. The method of claim 1 further comprising imposing prior to each subsequent stator current vector an inverse stator current vector with an inverse stator current vector direction on the stator winding, wherein the inverse stator current vector direction is 180° relative to the subsequent stator current vector direction of each subsequent stator current vector.

11. The method of claim 1 wherein during the plurality of current application operations each of the different stator current vectors is imposed on the stator winding for a time interval that does not exceed 100 ms.

12. The method of claim 1 wherein during the plurality of current application operations each of the different stator current vectors is imposed on the stator winding for a time interval that does not exceed 25 ms.

13. The method of claim 1 comprising considering only a direction of a driving torque or a direction of a movement generated by each preceding stator current vector as input for each subsequent stator current vector and each subsequent stator current vector direction.

14. The method of claim 1 further comprising pausing for a time interval of at least 25 ms between each of the plurality of current application operations.

15. The method of claim 1 further comprising determining a commutation offset based on the starting stator current vector.

16. A drive for a passenger transportation apparatus with a synchronous machine, the drive comprising:
a rotor;
a stator with a stator winding; and
a control unit configured to impose different stator current vectors with different stator current vector directions on the stator winding over a course of a plurality of current application operations, determine from the different stator current vectors a minimum stator current vector with a minimum stator current vector direction at which a minimum driving torque acting on the rotor is generated in the synchronous machine, determine from the minimum stator current vector a starting stator current vector with a starting stator current vector direction, and impose the starting stator current vector on the stator winding for starting the synchronous machine.

17. A passenger transportation apparatus configured as an escalator, a travelator, or an elevator system with a cabin that travels in an elevator shaft, the passenger transportation apparatus comprising a drive that comprises:
a rotor;
a stator with a stator winding; and
a control unit configured to impose different stator current vectors with different stator current vector directions on the stator winding over a course of a plurality of current application operations, determine from the different stator current vectors a minimum stator current vector with a minimum stator current vector direction at which a minimum driving torque acting on the rotor is generated in the synchronous machine, determine from the minimum stator current vector a starting stator current vector with a starting stator current vector direction, and impose the starting stator current vector on the stator winding for starting the synchronous machine.

* * * * *